United States Patent
Balasubramanian

(10) Patent No.: US 8,271,594 B2
(45) Date of Patent: Sep. 18, 2012

(54) MASTER-SLAVE INTERACTIONS SYNCHRONIZATION USING INSTANT MESSAGING

(75) Inventor: Swaminathan Balasubramanian, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/345,803

(22) Filed: Dec. 30, 2008

(65) Prior Publication Data

US 2010/0169428 A1    Jul. 1, 2010

(51) Int. Cl.
G06F 15/16    (2006.01)
(52) U.S. Cl. ......... 709/206; 709/203; 709/204; 709/208
(58) Field of Classification Search .......................... None
See application file for complete search history.

(56) References Cited

U.S. PATENT DOCUMENTS

| | | | |
|---|---|---|---|
| 2004/0215784 A1* | 10/2004 | Qi et al. | 709/205 |
| 2004/0266412 A1* | 12/2004 | Maes et al. | 455/414.4 |
| 2005/0278424 A1* | 12/2005 | White | 709/204 |
| 2006/0041686 A1* | 2/2006 | Caspi et al. | 709/248 |

* cited by examiner

Primary Examiner — Thu Nguyen
Assistant Examiner — Nam Tran
(74) Attorney, Agent, or Firm — Yudell Isidore Ng Russell PLLC

(57) ABSTRACT

Systems, methods, and computer program products for facilitating synchronized, two-way communications between a server application and one or more client applications. In one embodiment, the server application and client applications are provided with instant messaging (IM) clients that are supported by an IM server in a networked computing environment. A method disclosed includes registering at least one client application IM client in an IM registry, generating an event in the server application, and converting the event into an operation command that is independent of the states of the server or client applications. The method can also include transmitting the command to each client application IM client. The method can also include, at the client application, receiving the command, reconstituting an event from the command, and processing the event. The method can additionally include transmitting from the client application to the server application a completion notification upon completion of the processing of the event by the client application.

17 Claims, 9 Drawing Sheets

MASTER-SLAVE INTERACTIONS SYNCHRONIZATION USING INSTANT MESSAGING

BACKGROUND

1. Technical Field

Embodiments of the invention disclosed generally relate to systems and associated methods for communications between a server application and client applications in a networked computing environment. In particular, embodiments of the invention are directed to two-way communications between a server application and client applications using instant messaging.

2. Description of the Related Art

Because high speed networks facilitate effective team collaboration, globally distributed teams can operate without the need to be co-located. Meetings are routinely conducted using computer and telephony networks. For example, often the World Wide Web ("Web") and telephone networks are used to facilitate a meeting. In some cases, such collaborative work uses instant messaging (IM). As used here, IM refers generally to technology that allows the transmission of electronic messages in real time. More particularly, IM refers to a communications service that facilitates real time communications over the Internet. Still more particularly, IM is a technology (that is, methods or systems) that allow text-based messages to be transmitted in real time over computer networks such as the Internet. Increasingly, IM technology has been extended to include the transmission of images, files, hyperlinks, and other types of data other than text-based data. Publicly available applications such as Microsoft Messenger and Google Talk, as well as private or secured applications within organizations, are commonly used. The use of IM clients that can connect to more than one such application is also becoming routine.

Online meetings can be conducted using presentations ("presentations") or show-and-tell type demonstrations ("demonstrations"). Often, participants join a telephone conference with a presenter and have access to conference materials either via a local copy of the conference materials (common in presentations) or via a Web conference (common in demonstrations).

In the case of a presentation where all parties view the material locally, a presenter may desire that all participants view the same part of the material as the presentation proceeds. Often, to ensure synchronicity, the presenter constantly calls out the part of the material currently viewed, making the process distracting and ineffective. Even so, there can be no assurance that all participants are synchronized. For example, if a participant temporarily focuses on a different task, the participant might quickly be out of synchronization and needs to interrupt the presenter.

In the case of a demonstration, the material is accessible typically only to the presenter. Usually, participants view the material via a Web conference in which the presenter's interactions with the material are broadcast to the participants using a stream of non-interactive graphics. With this approach, participants do not have access to the actual material and are restricted to viewing only those interactions that the presenter chooses. Even in cases where the participants have access to the material locally (for example, a demonstration copy of an installed product) participants are unable to see in the local context the presenter's interactions with the material. Such a demonstration can become an ineffective learning process for the participants. Further, the broadcast of high resolution graphics to a large audience is often costly and impractical, resulting in wasted bandwidth for example. Additionally, this approach requires infrastructure that facilitates Web conferencing.

There exists a continuing desire for technology that facilitates communications via networks. Embodiments of the invention disclosed here are directed to various aspects, improvements, etc., of networked communications such as those described above.

SUMMARY OF ILLUSTRATIVE EMBODIMENTS

Disclosed are systems, methods, and computer programs for facilitating synchronized, two-way communications between a server application and one or more client applications. In a preferred embodiment, the server application and client applications are provided with instant messaging (IM) clients that are supported by an IM server in a networked computing environment.

In one aspect, the invention is directed to synchronizing a server application with one or more client applications using instant messaging (IM). The method comprises registering at least one client application IM client in an IM registry. The method further includes generating an event in the server application, and converting the event into an operation command that is independent of the states of the server or client applications. The method additionally includes transmitting the command to each client application IM client in the IM registry. In some embodiments, the method also includes, at the client application, receiving the command, reconstituting an event from the command, and processing the event. The method preferably also involves transmitting from the client application to the server application a completion notification upon completion of the processing of the event by the client application.

In another aspect, the invention concerns a data processing system (DPS) for managing synchronized two-way interactions between a server application and one or more client applications. The DPS includes a first IM client in communication with the server application. The DPS can further include a registry configured with at least one entry for each of the one or more client applications, said registry in communication with the first IM client. The DPS has a first transmit queue in communication with the server application and the first IM client, and a first receive queue in communication with the server application and the first IM client. The DPS is arranged such that the first IM client, registry, first transmit queue, and first receive queue cooperate to (a) transmit events generated by the server application to the one or more client applications, and (b) receive events generated by the one or more client applications.

A further aspect of the DPS is that events generated by the server application comprise Begin Operation, End Operation, Begin Individual Input, and End Individual Input. Another feature of the DPS is that events received from the one or more client applications comprise End Operation and End Individual Input.

In some embodiments of the DPS, the events received from the one or more client applications are transmitted via second transmit queues and second IM clients respectively associated with each of the one or more client applications.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

Figure 1:
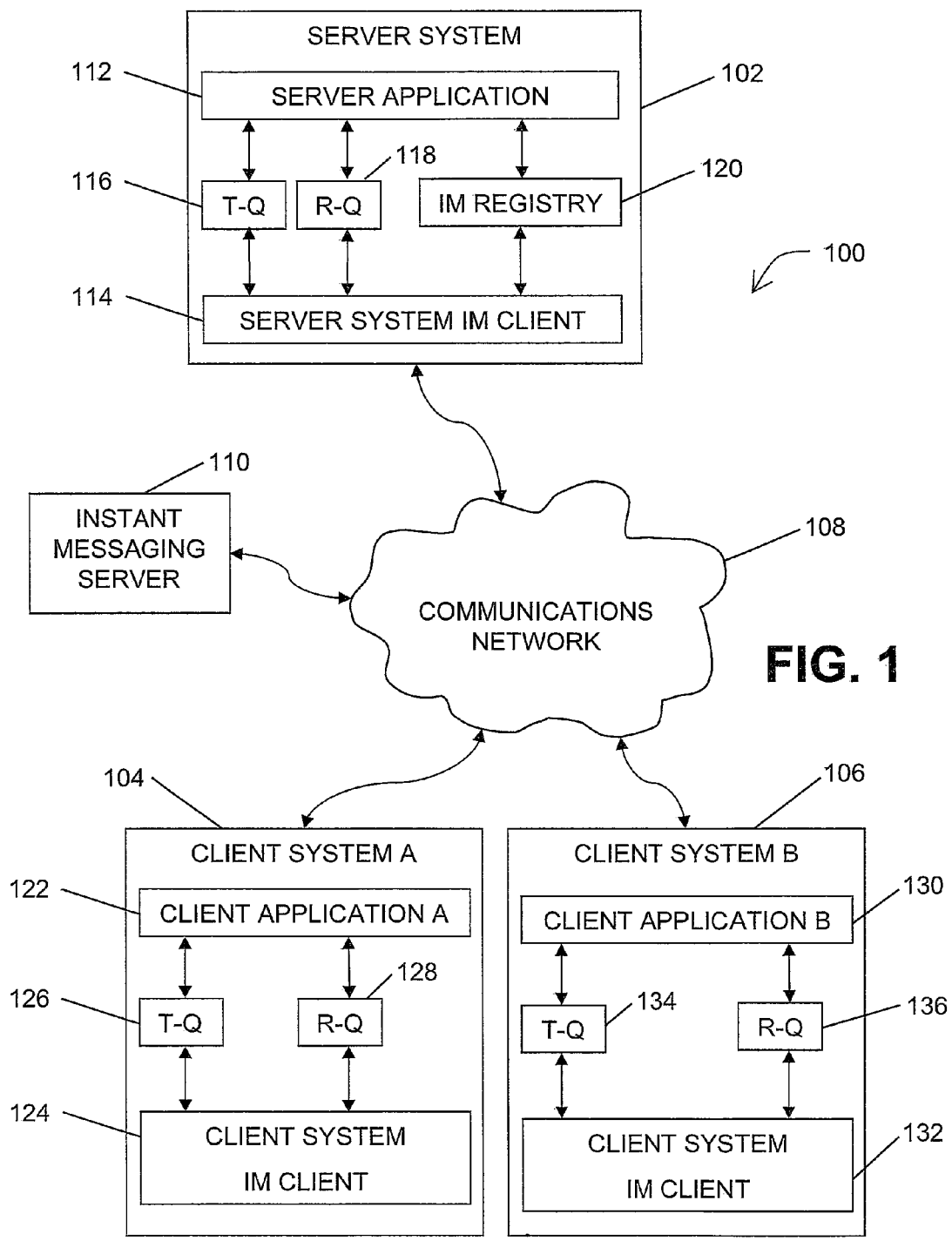
FIG. 1 is a high level schematic diagram of a networked computing environment configured with hardware and software components for implementing embodiments of the invention.

Disclosed are systems, methods, and computer programs for facilitating synchronized, two-way communications between a server application and one or more client applications. In a preferred embodiment, the server application and client applications are provided with instant messaging (IM) clients that are supported by an IM server in a networked computing environment.

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figures. The specific reference numerals used are provided only to aid in the description and not meant to imply any limitations (structural or functional) on the invention. Unless otherwise explicitly stated, it is understood that the use of specific component, device, or parameter names are exemplary only and not meant to imply any limitations on the invention. The invention can be implemented with different terminology used to describe the components, devices, or parameters herein. Each term used herein is to be given its broadest interpretation given the context in which that term is used.

As used here, the word "or" is used in the inclusive sense of "and/or". That is, the use of "or" in a list is not used in the exclusive sense. For example, in a list of A, B, C, or D, "or" indicates that a selection from the list could be A, B, C, and D, or A and B, or A and C, or B and D, or just A, just B, just C, just D, and so on. The exclusive sense of "or" will be explicitly pointed out or clearly identifiable in the context of a description. The exclusive sense of "or" refers to a meaning of "or" whereby a list of A, B, or C indicates that selection of one item excludes the others. That is, for example, if A is selected, then B and C are excluded from the selection.

As used here, the phrase "operation scope" indicates a series of events that when combined cause a change in the underlying state of an application. An "event" refers to an operation in a computer application that causes a change of state of the application. The term "event" can also include "pseudo-events," which include notifications or commands that do not by themselves cause a change in the state of an application. The term "IM client" refers to a communications application, service, or utility that facilitates instant messaging (IM) communications via an IM server between computing devices connected to a computer network.

One aspect of the invention concerns a method of two-way interactions between a server application and a client application. In one embodiment, besides the broadcast of events from a server application, presenters and participants exchange notification events. In another embodiment, a series of discrete events are grouped into an operation scope. Within an operation scope, a participant can undo and reapply events. In some embodiments, after exiting an operation, a presenter waits for all participants to exit as well. In other embodiments, participants enter individualized inputs, and presenters are automatically notified when all the participants have finished entering the individualized inputs.

Since both presenters and participants can transmit and receive events, aspects of the invention facilitate a presenter and participants to stay synchronized effectively. Participants can automatically notify the presenter when their application becomes unsynchronized or if they encounter errors in their local context. For example, in the case of local errors, a participant can reapply events previously executed. Additionally, because the system can be configured such that the presenter automatically waits until all participants have completed a set of events, synchronization between the presenter and the participants is improved. When individualized input is needed, the presenter can request the input from the participants and wait for them to complete the input.

FIG. 1 illustrates a networked computing environment 100, in which embodiments of the invention can be implemented. Networked computing environment 100 includes server system 102 in communication with client system A 104 and client system B 106 via communications network 108. In some embodiments, instant messaging (IM) server 110 is connected to communications network 108 to facilitate IM communications between server system 102 and client system A 104 or client system B 106. Although FIG. 1 shows only client system A 104 and client system B 106, embodiments of the invention contemplate that networked environment 100 can include one or more than two client systems.

Communications network 108 can be one or more cooperating networks of computers, telephone signals switching stations, satellite links, cellular phone towers, etc., configured to receive, transmit, and deliver data signals between or among server system 102, client system A 104, or client system B 106. In one embodiment, communications network 108 is the Internet, which is a worldwide collection of networks and gateways that use the Transmission Control Protocol/Internet Protocol (TCP/IP) suite of protocols to communicate with one another. In other embodiments, communications network 108 can be a virtual private network, intranet, local area network, wide area network, etc.

The depicted and discussed examples are not meant to imply any specific architectural or network limitations with respect to the present invention.

Server system 102, client system A 104, client system B 106, or IM server 110 can be any computing device capable of transmitting and receiving communication signals. In one embodiment, IM server 110 is a server computer configured with suitable hardware and software to facilitate IM communications between clients connected to network 108. In a preferred embodiment, server system 102, client system A 104, or client system B 106 are personal computing devices such as laptops, desktops, etc. In one embodiment, server system 102 is a computing device such as data processing system 200 illustrated in FIG. 2. In other embodiments, server system 102, client system 104, or client system 106 can be a mobile telephone, cellular phone, radio phone, personal digital assistant, smart phone, etc.

Preferably, server system 102 includes server application 112 configured to communicate with server system IM client 114 via transmit queue (T-Q) 116 and receive queue (R-Q) 118. In one embodiment, server system 102 includes IM registry 120 in communication with server application 112 and server system IM client 114. client system A 104 preferably includes client application A 122 in communication with client system IM client 124 via transmit queue 126 and receive queue 128. Similarly, client system B 106 preferably includes client application B 130 in communication with client system IM client 132 via transmit queue 134 and receive queue 136. For purposes of the inventive embodiments disclosed here, client system A 104, client system B 106, or additional client systems connected to server system 102 via communications network 108, are substantially the same in the relevant architecture and functionality. Hence, for convenience and simplicity, hereinafter the description will reference only client system A 104; however, any description of, or related to, client system A 104 is equally applicable to client system B 106 or other client systems included in networked environment 100.

In one implementation of certain inventive aspects disclosed here, some events generated by server application 112 are transmitted to client application A 122 via transmit queue 116, server system IM client 114, communications network 106, IM server 108, client system IM client 124, and receive queue 128 of client system A 104. Typically, multiple client systems are registered in IM registry 120, and events are sent to each client system included in IM registry 120, which is continuously updated as client applications 122, 130 join or leave a meeting, for example. An event can also be transmitted from client client application A 122 to server application 112 via transmit queue 126, client system IM client 124, communications network 108, IM server 110, server client system IM client 114, and receive queue 118. Preferably, at least some of the events transmitted from server application 102 to client application A 122 are commands that control client application A 122 in such a way as to maintain client application A 122 in synchronization with server application 112. Also, preferably at least some of the events transmitted from client application A 122 to server application 112 are notifications regarding the state of client application A 122. For example, client application A 122 can notify server application 112 that client application A 122 has exited an operation scope or that entry of personalized input has ended. Events stored in queues 116, 118, 126, 128, 134, or 136 are preferably forwarded or fetched in order of occurrence.

Thus, networked environment 100 is configured to facilitate two-way communications between server application 112 and client application A 122 via communications network 108, with the support of IM server 110, server application IM client 114, and client application IM client 124. It should be noted that in some embodiments, server application IM client 114 and client application IM client 124 are substantially the same software application or utility, which is configured to be a general communication service that facilitates instant messaging functionality.

Figure 2:
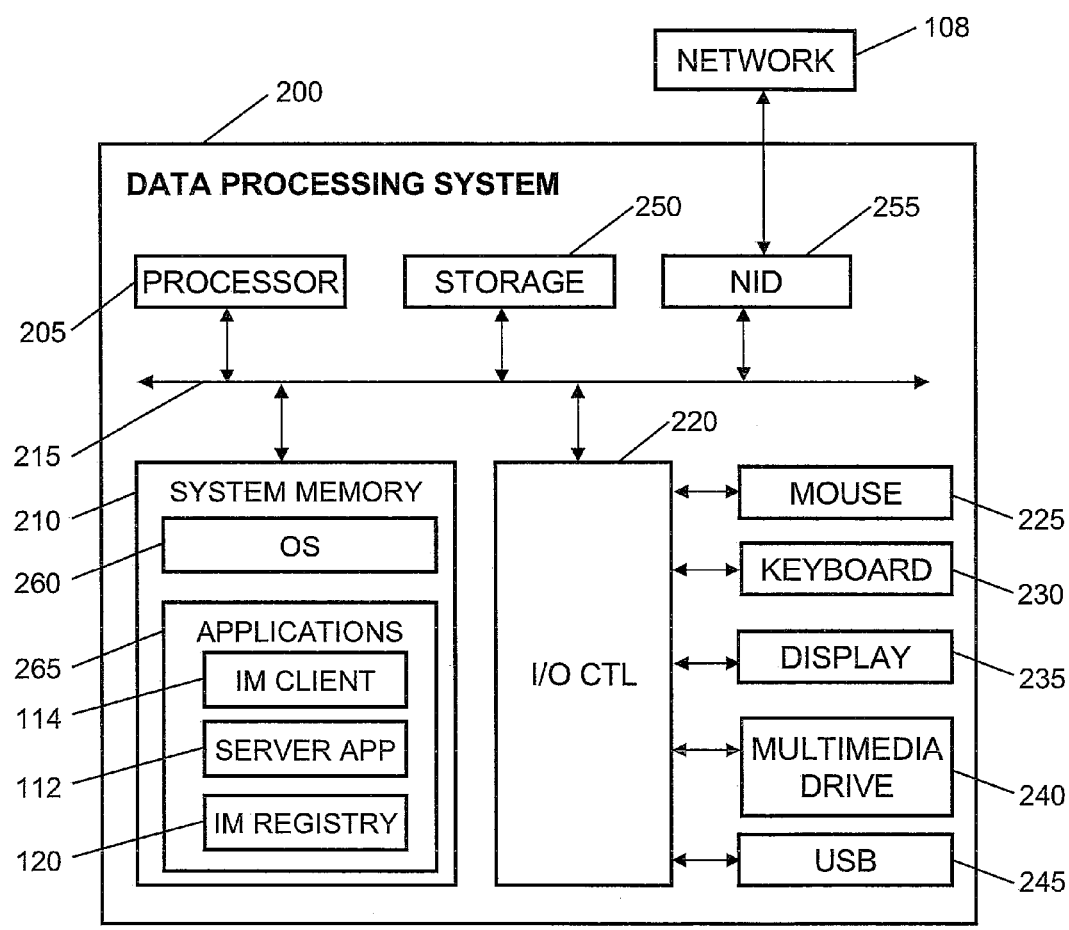
FIG. 2 is a block, schematic diagram of a data processing system that can be used in the networked computing environment of FIG. 1.

FIG. 2 depicts a block diagram of data processing system 200. Data processing system 200 is an exemplary computing device that can be used as server system 102, client system A 122, or IM server 110. In one embodiment, data processing system 200 includes at least one processor 205 coupled to system memory 210 via system bus 215. System memory 210 is a lowest level of memory and may include, for example, DRAM, flash memory, etc. Data processing system 200 can include additional volatile memory, such as cache memory, registers, and buffers. I/O controller 220 is coupled to system bus 215 and provides connectivity and control for input devices, such as mouse 225 and keyboard 230, and output devices, such as display 235. Multimedia drive 240 (for example, CDRW or DVD drive) and universal serial bus (USB) hub 245 can be coupled to I/O controller 220. Multimedia drive 240 and USB hub 245 may operate as both input and output (storage) mechanisms. Data processing system 200 can also include storage 250, within which data, instructions, or code can be stored. Network interface device (NID) 255, coupled to system bus 215, enables data processing system 200 to connect to an access network, such as communications network 108.

Notably, in addition to the above described hardware components of data processing system 200, various features can be provided via software or firmware code or logic stored in system memory 210, or other data storage (for example, storage 250), and executed by processor 205. In one embodiment, data, instructions, or code from storage 250 populates the system memory 210. Thus, system memory 210 can include software or firmware components, such as operating system (OS) 260 and applications 265. In the case, for example, where data processing system 200 is server system 102, applications 265 can include server application 112, server system IM client 114, transmit queue 116, receive queue 118, and IM registry 120, as shown in FIG. 2. However, in the case where data processing system 102 is client system A 104, application 265 can include client application A 122, client system IM client 124, transmit queue 126, and receive queue 128. OS 260 can be, for example, Microsoft Windows®, GNU®, Linux®, or Advanced Interactive eXecutive (AIX®).

In actual implementation, server application 112, server system IM client 114, transmit queue 116, receive queue 118, and IM registry 120 may be combined as a single application collectively providing the various functions of each individual software component when processor 205 executes the corresponding code. For simplicity, server application 112, server system IM client 114, transmit queue 116, receive queue 118, and IM registry 120 are illustrated and described as stand alone software or firmware components, which are stored in system memory 210 to provide or support the specific inventive functions described herein. In some embodiments, however, components or code of OS 260 may be combined with that of server application 112, server system IM client 114, transmit queue 116, receive queue 118, and IM registry 120, collectively providing the various functional features of the invention when processor 205 executes the corresponding code.

In certain embodiments, processor 205 executes OS 260, applications 265, server application 112, server system IM client 114, transmit queue 116, receive queue 118, and IM registry 120. OS 260 supports the user interface features of server application 112, server system IM client 114, transmit queue 116, receive queue 118, and IM registry 120. It is noted that, depending on the specifics of any given configuration, each of server system 102, client system 104, and IM server 110 can be provided with a general computing architecture based on data processing system 200. However, the hardware or software functionality comprised by server system 102, client system 104, or IM server 110 can be customized for a specific user, use, or local environment.

As will be particularly described below, in one embodiment, server system 102, client system 104, or IM server 110 is provided with suitable IM server code, IM clients 114, 124, server application 112, transmit queue 116, receive queue 118, IM registry 120, client application A 122, transmit queue 126, and receive queue 128 for facilitating synchronization and two-way communications between server application 112 and client application 122 in the networked environment 100. Among exemplary software code provided is software code for: (a) registering client applications in a registry, and (b) using queues and IM clients to facilitate transmission and receipt of events between a server application and a client application. Depending on the specific embodiment, server system 102 or client system 104 can include some or all of the exemplary code functions. Additionally, applications 265 of server system 102 or client system 104 can include program code for other processing functionality further discussed below. According to the illustrative embodiment, when processor 205 executes server application 112 or client application 122, data processing system 200 initiates a series of processes that enable the above functional features as well as additional features or functionality, which are described below with reference to FIGS. 5A-6.

Those of ordinary skill in the relevant technology will appreciate that the hardware and basic configuration depicted in FIGS. 1-2 may vary. For example, other devices or components may be used in addition to or in place of the hardware depicted. The depicted example is not meant to imply architectural limitations with respect to the present invention. Networked computing environment 100 can include, for example, an IBM eServer pSeries system (not shown), a product of International Business Machines Corporation of Armonk, N.Y.

Figure 3:
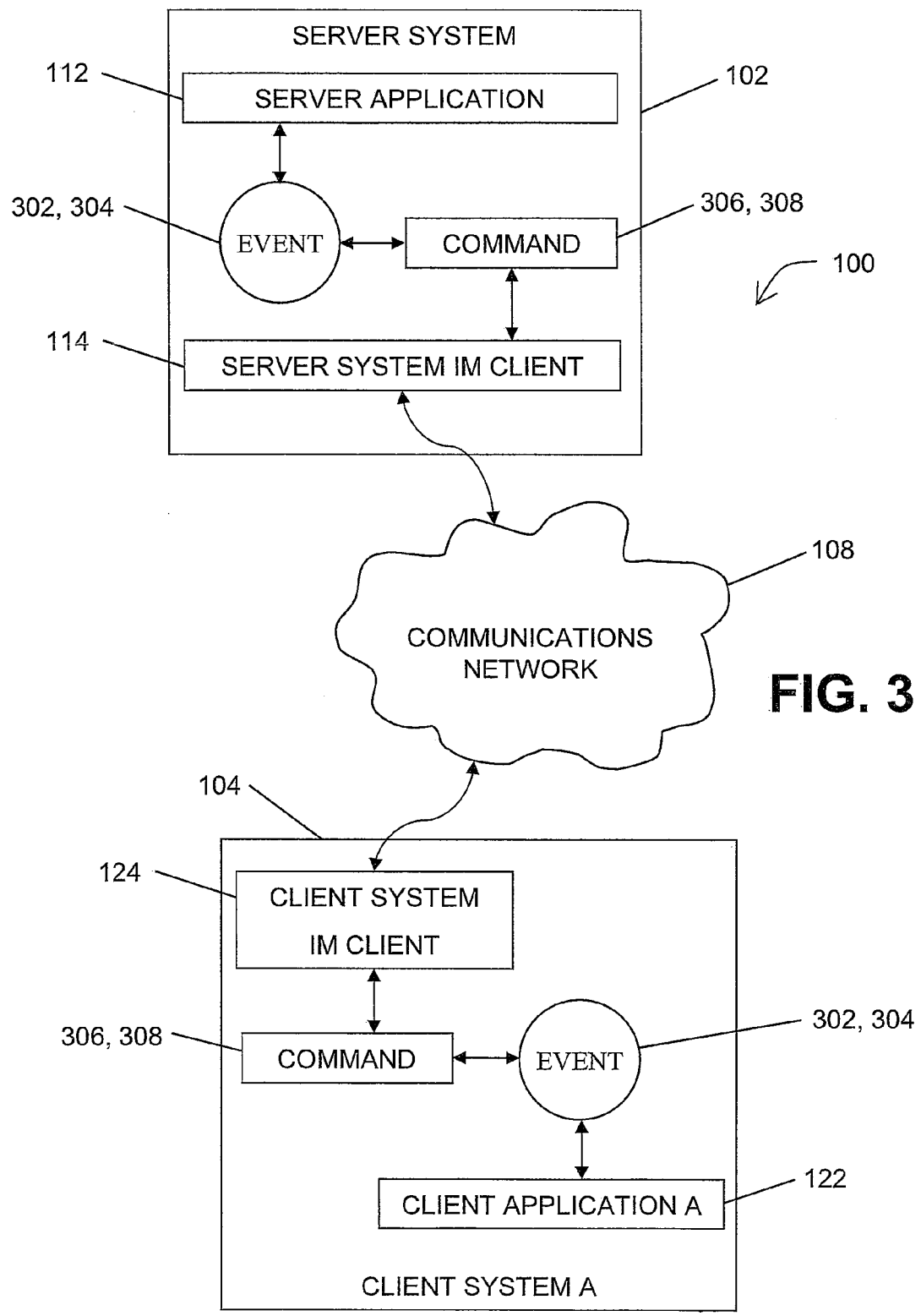
FIG. 3 is a schematic diagram showing a flow of commands and events between a server system and a client system of the networked computing environment of FIG. 1.

FIG. 3 is a schematic diagram that describes two-way interactions between server application 112 and client application A 122. Event 302 is generated at server application 112 and sent to client application A 122; event 304 is generated at client application A 122 and sent to server application 112. Although server application 112 can generate many events, preferably only a subset of them is transmitted to client application A 122. Taking Microsoft Word® as an example, events such as "auto save" are specific to the local context of server application 112 and need not be transmitted. Further, certain user interface activities (such as 'mouse move') generate hundreds of intermediate events. server application 112 can be configured to filter out intermediate events. In a preferred embodiment, server application 112 generates notification events such as: Begin Operation, End Operation, Begin Individualized Input, and End Individualized Input.

Event 302, which is relative to the state of server application 112, is preferably converted into serialized command 306. To illustrate a benefit of this conversion, consider that a presenter is using Microsoft PowerPoint®, is on slide 5, and presses the 'Page Down' button. This generates a 'Page Down' event (for example, event 302) which is processed in a conventional manner by server system 102. However, in client system 104, event 302 is preferably received as an absolute command independent of any assumptions about the state of client application A 122. In this example, event 302 is serialized into command 306, such as "move to slide 6." server system IM client 114 sends command 306 to client system A 104 using IM server 110. Client system IM client 124 receives command 306 and passes command 306 to client application A 122. Command 306 is reconstituted into event 302 and processed by client application A 122. Similarly event 304 generated in client application A 122 follows the reverse path (i.e., conversion to a serialized command 308) to be transmitted to server application 112. Events in client application A 122 can be notification events that include "End Operation" and "End Individualized Input."

An operation scope is preferably defined within server application 112. Following are aspects of an exemplary operation scope. Begin Operation and End Operation events of an operation scope are defined in server application 112, and are transmitted as notification commands to client application A 122. Because Begin Operation and End Operation are commands that do not alter the state of an application, they can be thought of as pseudo-events. When exiting an operation scope (after an End Operation notification command), server application 112 waits to receive End Operation notification commands from all registered client applications before resuming. Preferably, events contained in an operation scope can be reapplied within client application A 122 without altering its state.

Figure 4:
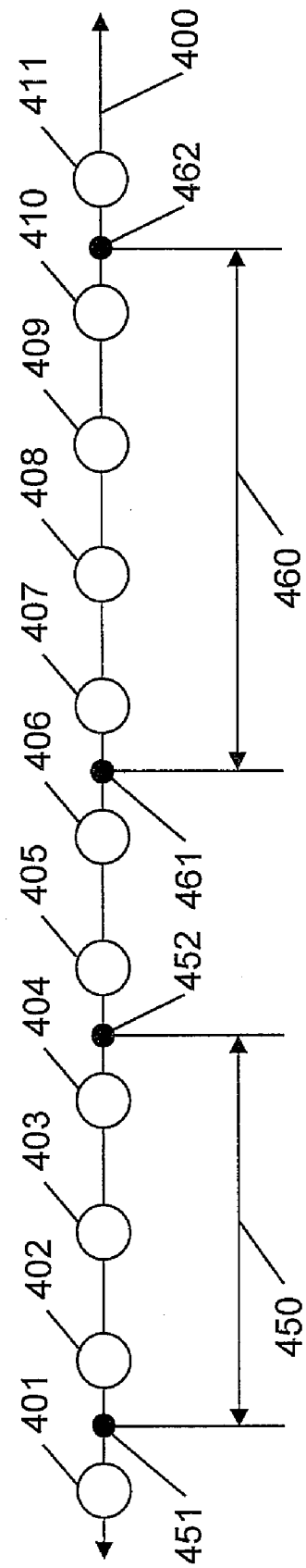
FIG. 4 is a schematic diagram of exemplary events, associated timeline, and operation scopes that can be used with the client-server system of FIG. 3.

FIG. 4 schematically illustrates a snapshot of events generated in server application 112 within timeline 400. Timeline 400 contains operation scopes 450 and 460. Operation scope 450 includes pseudo-event Begin Operation 451, application events 402-404, and pseudo-event End Operation 452. Similarly, operation scope 460 includes pseudo-event Begin Operation 461, application events 407-410, and pseudo-event End Operation event 462. It can be seen that each event need not be associated with an operation scope. For example, application events 401, 405, 406, and 411 are not associated with an operation scope. Operation scopes can also be nested, in which case it is preferable to associate a unique identifier with each operation scope.

In some scenarios when operating in local environments, meeting participants need to enter individual inputs (that is, input unique to each participant). For example, it might be needed to supply user credentials which cannot be shared. In a preferred embodiment, server application 112 generates a Begin Individualized Input pseudo-event (or notification) that is transmitted to client application A 122. Further, in a preferred embodiment, the Begin Individualized Input pseudo-event may contain instructive or descriptive text pertaining to the individual inputs to be displayed in each client application A 122. Following this, events in server application 112 are not transmitted to client application A 122 until server application 112 generates a notification event End Individualized Input. This notification event is transmitted to client application A 122. In one embodiment, events in server application 112 are not transmitted to client application A 122 until server application 112 receives a notification event End Individualized Input from each client application A 122. In another embodiment, server application 112 pauses until server application 112 receives a notification event End Individualized Input from each client application A 122.

FIGS. 5A-5D are flow charts that illustrate method 500 of managing two-way communications between server system 102 and client systems 104, 106 in the networked environment 100 of FIG. 1. Referencing FIG. 5A, Method 500 begins at a start step 501, in which preferably server system 102, client systems 104, 106, and IM server 110 have been configured with suitable hardware and software to support the steps of method 500. The IM registry 120 is initialized (502), and the transmit queue 116 and receive queue 118 are initialized (504). Next, it is queried whether a client application 122, 130 is starting (506). If no client applications are starting, method 500 continues at decision step 516. However, if there are client applications starting, method 500 proceeds to step 508, wherein client application A 122 is connected to client system IM client 124, for example. client IM client 124 is registered with IM registry 120 (510), and transmit queue 126 and receive queue 128 of client system A 104 are initialized (512). Next, it is queried whether another client application is starting (514). If it is the case that another client application is starting, then method 500 returns to step 508 to process the additional client application. If no more client applications are starting, method 500 proceeds to decision step 516.

At decision step 516 it is queried whether events have been generated in server application 112. If no events have been generated in server application 112, method 500 continues at decision step 522. However, method 500 proceeds to step 518 when events have been generated in server application 112. The generated event is converted into a serialized command (518). As previously explained, it is preferable that events be converted to absolute commands independent of any assumptions about the state of client application A 122. The command is then added to transmit queue 116 of server system 112 (520). It should be noted that, as already mentioned, not every event generated in server application 112 need be part of an operation scope or be transmitted to client applications. For example, user interface activities that generate intermediate events can be filtered out and not placed in transmit queue 116. In such a case, in decision step 516, the generated intermediate event may be discarded. Method 500 next proceeds to decision step 522, wherein it is queried whether there is a command in transmit queue 116. If there are no commands in transmit queue 116, method 500 proceeds to decision step 528. However, when there are commands in transmit queue 116, method 500 continues at step 524, wherein server system IM client 114 fetches a command from transmit queue 116. The command is then transmitted via server system IM client 114 to each client application registered in IM registry 120 (526).

At decision step 528, it is determined whether client system IM client 124 has received a command forwarded from server system 102. When no command has been received, method 500 proceeds to decision step 532. However, when a command has been received, the command is added to receive queue 128 (step 530). Method 500 continues to decision step 532, wherein it is queried whether there is a command in client system receive queue 128. If there are no commands in client system receive queue 128, method 500 proceeds to decision step 540. If there are commands in receive queue 128, a command from receive queue 128 is fetched (step 534). An event is then reconstituted from the fetched command (step 536). Client application A 122, for example, can then process the event (step 538). Method 500 continues at decisions step 540.

At decision step 540, it is queried whether a client application is terminating, that is, leaving a conference or meeting, for example. If no client application is terminating, method 500 proceeds to decision step 550. However, if a client application is terminating, method 500 continues at step 542, wherein client system IM client notifies server system IM client that client application is terminating. At step 544 of method 500, the client application entry is removed from IM registry 120. The client application then terminates (546). Method 500 proceeds to decision step 548, wherein it is determined whether another client application is terminating. When another client application is terminating, method 500 returns to step 542; however, when no other client application is terminating, method 500 continue to decision step 550.

At decision step 550, it is determined whether client application A 122, for example, has exited an operation scope. When client application A 122 has not exited an operation scope, method 500 continues at decision step 558. However, if client application A 122 has exited an operation scope, a notification event (for example, End Operation) is placed in transfer queue 126 (552). Next, client system IM client 124 transmits command (i.e., a notification) to server system 102 (554), and server system IM client 114 adds the command to receive queue 118 (556). Method 500 next proceeds to decision step 558.

At decision step 558, it is queried whether server application 112 has exited an operation scope. Where server application 112 has not exited an operation scope, method 500 continues at a decision step 566. If server application 112 has exited an operation scope, method 500 proceeds to step 560, wherein a notification event is fetched from receive queue 118. The client is then marked as exited from operation scope (562). Method 500 continues at decision state 564, wherein it is determined whether all the client applications have exited an operation scope. If not all client applications have exited an operation scope, method 500 returns to step 560. When all the client applications have exited the operation scope, method 500 proceeds from decision step 564 to decision step 566.

Figure 5A:
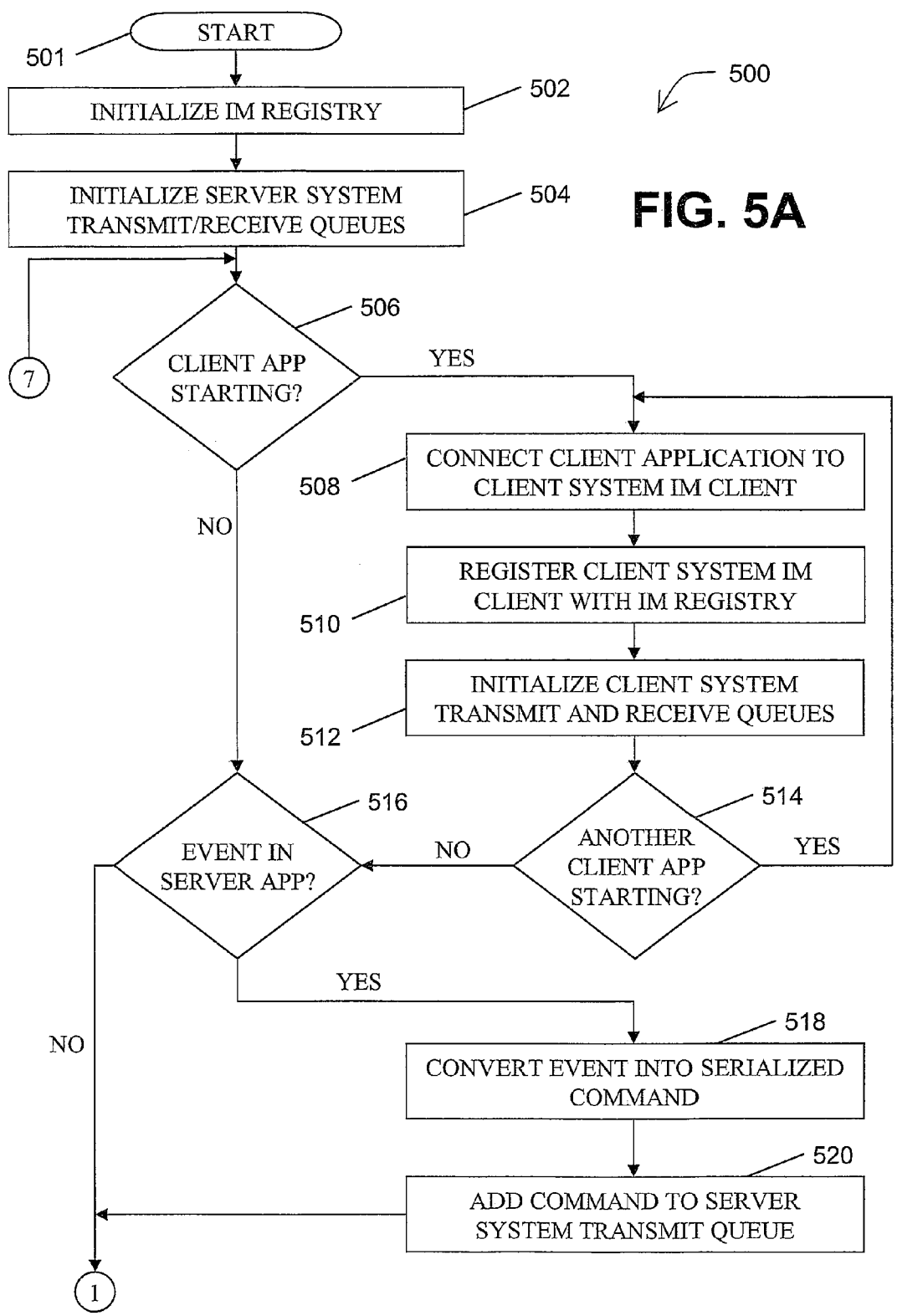
FIGS. 5A-5D collectively are a flowchart that illustrates a method in accordance with the invention for use with the client-server system of the networked computing environment shown in FIG. 1.
Figure 5B:
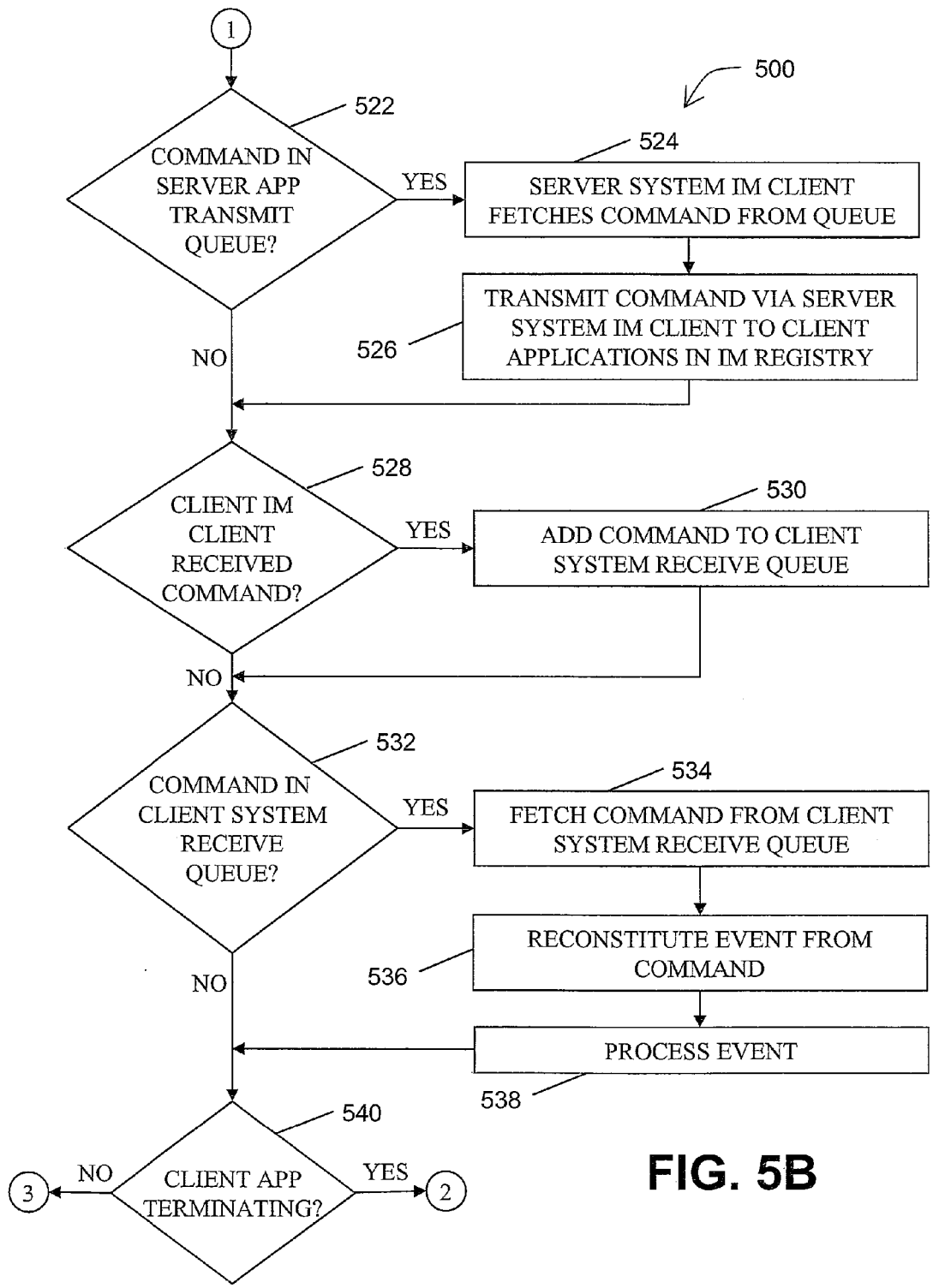
Figure 5C:
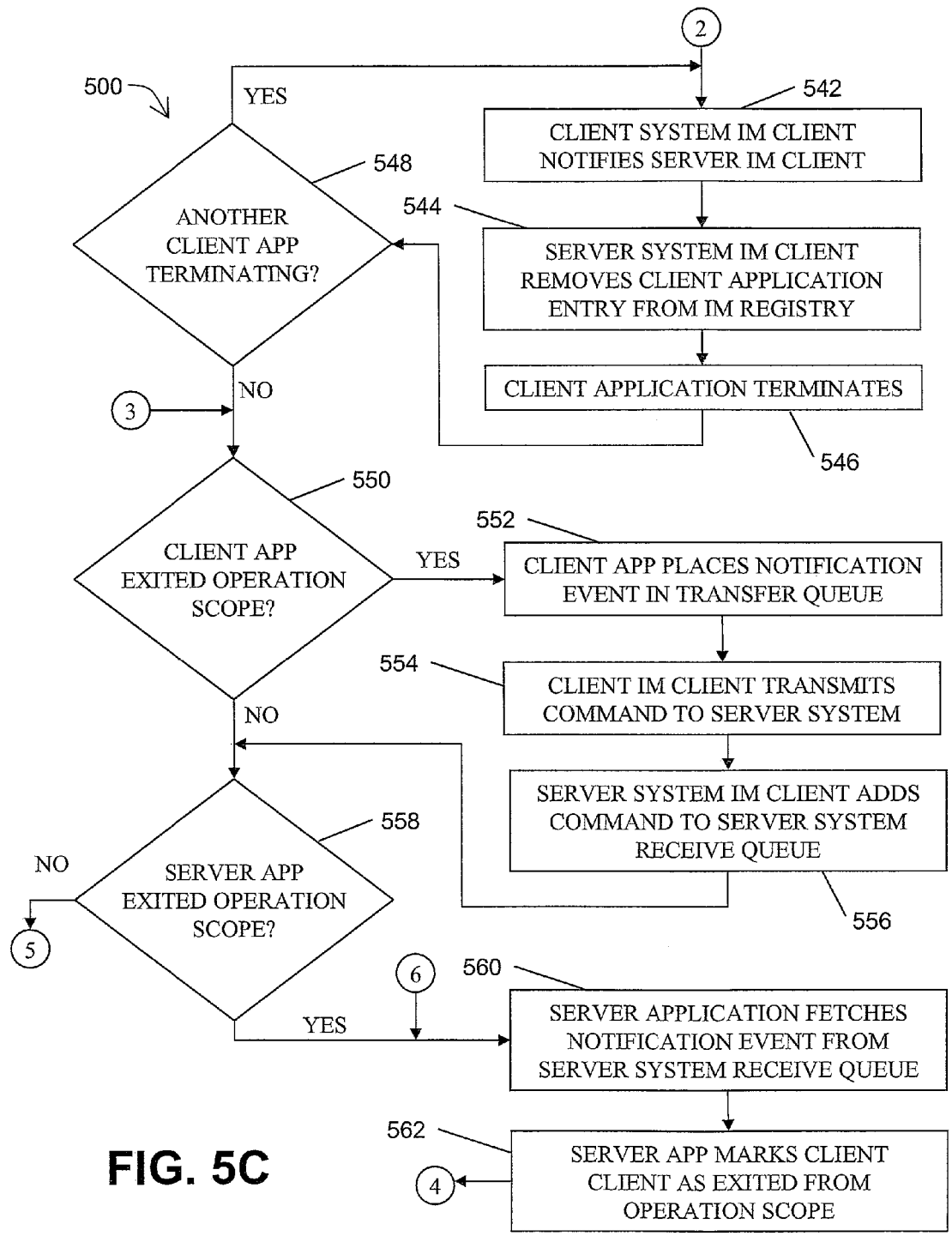
Figure 5D:
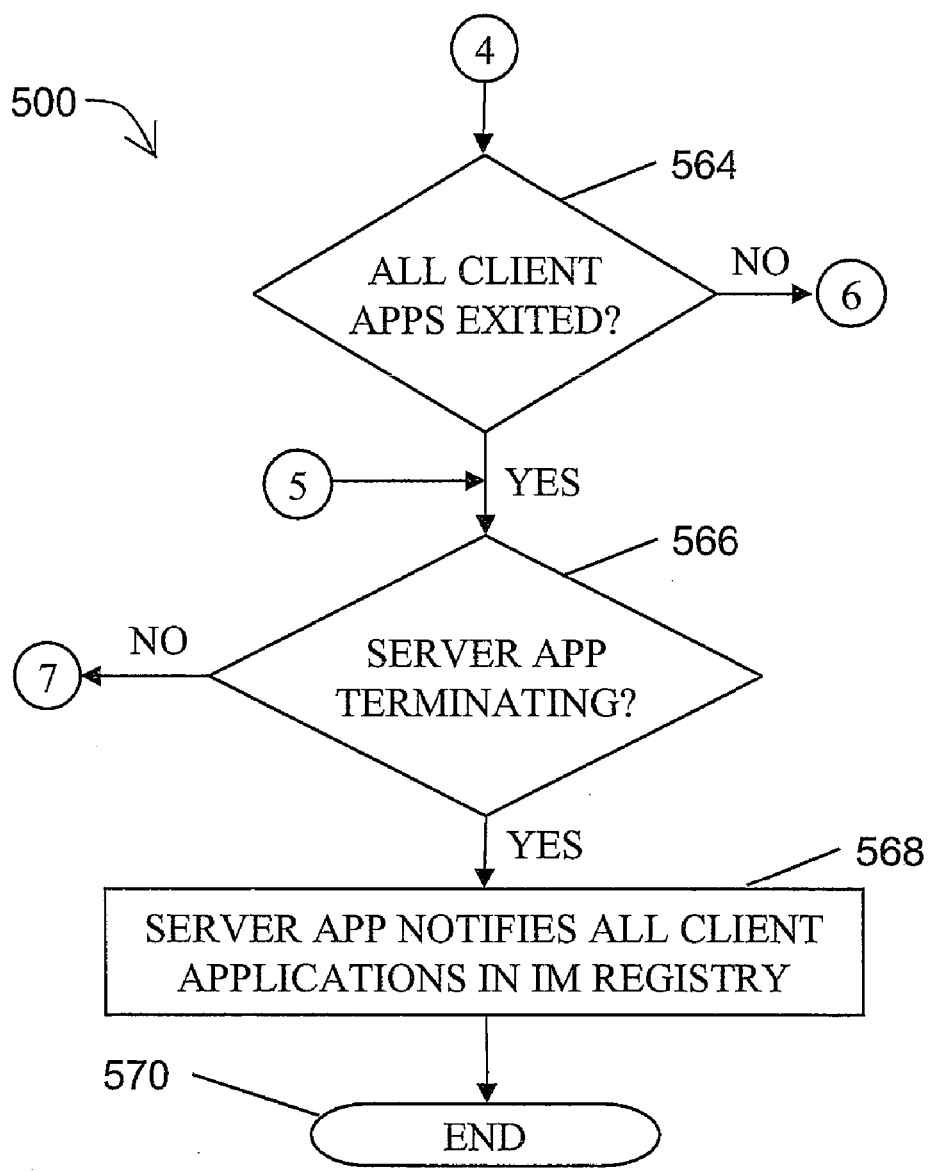

At decision step 566 it is determined whether server application 112 is terminating. If server application 112 is not terminating, method 500 returns to decision step 506 (FIG. 5A). If server application 112 is terminating, server application 112 notifies this to all client applications in IM registry 120 (568). Method 500 then ends at end step 570.

Figure 6:
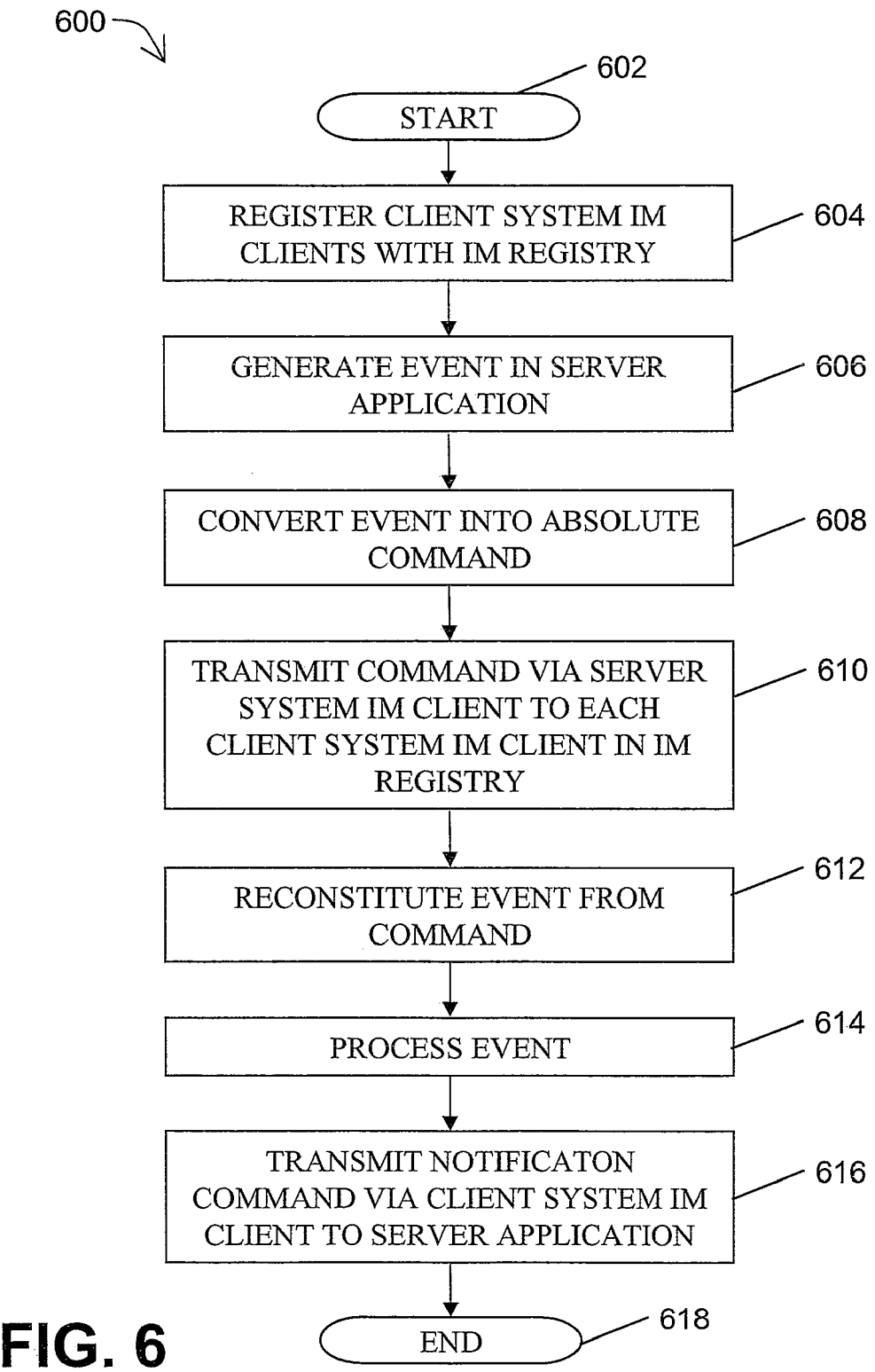
FIG. 6 is a flowchart of another method that can be used with the client-server system of the networked computing environment shown in FIG. 1.

FIG. 6 is a flowchart illustrating a method 600 of providing two-way communications between a server application and one or more client applications, which method 600 can be implemented in the networked computing environment 100 and associated data processing systems 200. Method 600 begins at start step 602, wherein a server system is configured to facilitate the performance of method 600. For example, at start step 602 transmit and receive queues of server system can be initialized, and a registry of client applications can be provided and configured to be populated. In a preferred embodiment, method 600 employs well-known instant messaging (IM) technology. However, any real-time (or substantially real-time) network communications technology can be used to perform method 600. At step 604, one or more client IM clients are registered in an IM registry. In one embodiment, client applications are registered only before the beginning of a presentation or demonstration; however, in other embodiments, client applications can be registered during the presentation or demonstration. The IM registry can reside at the server system or in a server connected to networked computing environment 100 and in communication with the server system.

During a presentation or a demonstration, an event is generated in the server application (606). Preferably, at step 608, the event is converted into an absolute command (that is, a command that is independent of the state of the client application, or a command wherein no assumptions are made about the state of the client application). The event can be a pseudo-event such as Begin Operation, End Operation, Begin Individual Input, End Individual Input, etc., or an application event, such as a "cut," "paste," "rotate," "page down," etc. At step 610, the command is transmitted via the server application IM client to each client application IM client in the IM registry. At step 612, the event is reconstituted from the command transmitted, and each client application processes the event at step 614. In one embodiment, the server application and client applications are synchronized at the operation scope level. Hence, the client systems and client applications can be configured such that an operation scope can be reapplied in a client application. In some embodiments, no events are transmitted to the client application from the server system until the client application has exited an operation scope. In an alternative embodiment, events in a receive queue of the client system are not forwarded to the client application until the client application has exited an operation scope.

At step 616 a notification (command or event) can be transmitted via a client application IM client from the client application to the server application. For example, each client client can notify the server application of End Operation or End Individual Input events. In some embodiments, no events are transmitted from the server system to the client systems while the server application waits for all of the client applications to provide a desired notification, such as End Individual Input. Method 600 can then end at step 618. Alternatively, method 600 does not proceed to end step 618, but rather, returns to step 604 to continuously perform steps 604-616 until the server application terminates.

It should be noted that certain steps of method 500 can be combined with steps of method 600. For example, method 600 can additionally include a step of determining whether a client application is terminating (540) and a step of removing the client application entry from the IM registry (544).

In the flow charts and/or functional block diagrams above, one or more of the methods can be embodied in a computer writable and/or readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable and writable storage media such as fixed (hard) drives, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program code in accordance with the invention.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of synchronizing a server application with one or more client applications using instant messaging (IM), the method comprising:
   an IM client executing on a client data processing system registering in an IM registry on a server data processing system;
   based upon registration in the IM registry, the IM client receiving from the server data processing system via IM an operation command that is independent of the state of a client application executing on the client data processing system, wherein the operation command corresponds to an event in a server application executing on the server data processing system;
   in response to receiving the operation command:
   the client data processing system reconstituting the event from the operation command and processing the reconstituted event at the client application; and
   in response to completion of processing of the reconstituted event by the client application, the client application transmitting a completion notification via the IM client to the server data processing system indicating that the client application has completed processing of the event;
   wherein the event is one of a plurality of events in the server application defined as an operation scope, and wherein when the client application exits the operation scope, the completion notification is End Operation.

2. The method of claim 1, and further comprising the server application delaying transmission of at least some events to the IM client until the server application receives the completion notification.

3. The method of claim 2, and further comprising the server application pausing execution while waiting to receive the completion notification from the client application.

4. The method of claim 1, and further comprising the client application transmitting to the server application via IM a notification that the client application is terminating.

5. The method of claim 4, and further comprising:
   in response to receiving a notification that the client application is terminating, the server application removing an entry in the IM registry registering the IM client.

6. The method of claim 1, wherein the operation command received by the client data processing system corresponds to a Begin Individual Input event requesting input.

7. The method of claim 6, and further comprising the client application displaying an input prompt specified by the Begin Individual Input event within a user interface presented in a display device of the client data processing system.

8. The method of claim 1, wherein:
the operation command comprises a first command; and
transmitting a completion notification via the IM client to the server data processing system includes the IM client converting the completion notification into a second command and transmitting the second command to the server data processing system via IM.

9. A data processing system comprising:
a processor;
data storage coupled to the processor, the data storage including:
   a client application; and
   an instant messaging (IM) client in communication with the client application;
   a transmit queue in communication with the client application and the IM client;
   a receive queue in communication with a server application and the IM client; and
wherein the IM client, client application, transmit queue, and receive queue are configured to cooperate to perform:
registering the IM client in an IM registry on a server data processing system;
based upon registration in the IM registry, receiving from the server data processing system via IM an operation command that is independent of the state of the client application, wherein the operation command corresponds to an event in the server application that is executing on the server data processing system;
in response to receiving the operation command:
   reconstituting the event from the operation command and processing the reconstituted event by the client application;
   in response to completion of processing of the reconstituted event by the client application, the client application transmitting a completion notification via the IM client to the server data processing system indicating that the client application has completed processing of the event;
wherein the event is one of a plurality of events in the server application defined as an operation scope, and wherein when the client application exits the operation scope, the completion notification is End Operation.

10. The data processing system of claim 9, wherein operation commands received by the client application comprise Begin Operation, End Operation, Begin Individual Input, and End Individual Input.

11. The data processing system of claim 9, wherein:
the operation command comprises a first command; and
transmitting a completion notification via the IM client to the server data processing system includes the IM client converting the completion notification into a second command and transmitting the second command to the server data processing system via IM.

12. The data processing system of claim 9, wherein:
the operation command corresponds to a Begin Individual Input event;
the data processing system includes a display device; and
the client application displays an input prompt specified by the Begin Individual Input event within a user interface presented in the display device.

13. A computer program product, comprising:
a non-transitory machine-readable storage medium;
program code stored within the non-transitory machine-readable storage medium that, when executed by a data processing system causes the data processing system to perform:
   registering an instant messaging (IM) client executing on a client data processing system in an IM registry on a server data processing system;
   based upon registration in the IM registry, the IM client receiving from the server data processing system via IM an operation command that is independent of the state of a client application executing on the client data processing system, wherein the operation command corresponds to an event in a server application executing on the server data processing system;
   in response to receiving the operation command:
      reconstituting the event from the operation command and processing the reconstituted event by the client application;
      in response to completion of processing of the reconstituted event, the client application transmitting a completion notification via the IM client to the server data processing system indicating that the client application has completed processing of the event;
   wherein the event is one of a plurality of events in the server application defined as an operation scope, and wherein when the client application exits the operation scope, the completion notification is End Operation.

14. The computer program product of claim 13, wherein the program code further causes the client application to transmit to the server application a notification that the client application is terminating.

15. The computer program product of claim 13, wherein the operation command received by the IM client corresponding to an Begin Individual Input event.

16. The program product of claim 13, wherein:
the operation command comprises a first command; and
transmitting a completion notification via the IM client to the server data processing system includes the IM client converting the completion notification into a second command and transmitting the second command to the server data processing system via IM.

17. The program product of claim 13, wherein:
the operation command corresponds to a Begin Individual Input event;
the program code further causes the client application to display an input prompt specified by the Begin Individual Input event within a user interface presented in a display device of the client data processing system.

* * * * *